(12) United States Patent
Moser

(10) Patent No.: US 6,761,032 B2
(45) Date of Patent: Jul. 13, 2004

(54) FUEL SUPPLY SYSTEM AND AN ASSOCIATED OPERATING METHOD

(75) Inventor: Ulrich Moser, Wettingen (CH)

(73) Assignee: Alstom Technology LTD, Baden (CH)

(*) Notice: Subject to any disclaimer, the term of this patent is extended or adjusted under 35 U.S.C. 154(b) by 0 days.

(21) Appl. No.: 10/160,239

(22) Filed: Jun. 4, 2002

(65) Prior Publication Data

US 2003/0041599 A1 Mar. 6, 2003

(30) Foreign Application Priority Data

Jun. 5, 2001 (DE) .......................................... 101 27 289

(51) Int. Cl.⁷ .............................................. F02C 9/28
(52) U.S. Cl. ..................................... 60/773; 60/37.281
(58) Field of Search .............................. 60/39.281, 773

(56) References Cited

U.S. PATENT DOCUMENTS

| | | | |
|---|---|---|---|
| 4,437,303 A | 3/1984 | Cantwell | |
| 4,922,710 A * | 5/1990 | Rowen et al. | ........... 60/39.281 |
| 5,115,635 A | 5/1992 | Jennings et al. | |
| 5,259,186 A * | 11/1993 | Snow | ...................... 60/39.281 |
| 5,303,541 A | 4/1994 | Goff et al. | |
| 5,447,023 A | 9/1995 | Meisner et al. | |
| 5,752,378 A * | 5/1998 | Mirsky et al. | ................. 60/773 |
| 6,148,601 A | 11/2000 | Jones et al. | |
| 6,226,976 B1 | 5/2001 | Scott et al. | |
| 6,247,919 B1 | 6/2001 | Welz, Jr. et al. | |

* cited by examiner

*Primary Examiner*—Louis J. Casaregola
(74) *Attorney, Agent, or Firm*—Burns, Doane, Swecker & Mathis, L.L.P.

(57) ABSTRACT

The invention relates to a fuel supply system (1) that supplies a fuel to a burner arrangement (8) with at least one burner (7), in particular a gas turbine (10). The fuel supply system (1) has at its input a control valve (3) that feeds the fuel into the fuel supply system (1) as a function of its actuation. As a function of a requested burner output, a first setpoint is determined for a fuel mass flow with which the burner arrangement (8) must be supplied in order to be able to furnish the required burner output. As a function of this first setpoint of the fuel mass flow a second setpoint is determined for the fuel mass flow, which is fed into the fuel supply system (1) by an actuation of the control valve (3). The second setpoint of the fuel mass flow is selected such that the fuel supply system (1) fed therewith supplies the burner arrangement (8) with the first setpoint of the fuel mass flow.

8 Claims, 1 Drawing Sheet

FUEL SUPPLY SYSTEM AND AN ASSOCIATED OPERATING METHOD

This application claims priority under 35 U.S.C. §§119 and/or 365 to Appln. No. 101 27 289.8 filed in Germany on Jun. 5. 2001; the entire content of which is hereby incorporated by reference.

FIELD OF THE INVENTION

The invention relates to a fuel supply system that supplies a fluid, that is to say gaseous or liquid, fuel to a burner arrangement with at least one burner, in particular a gas turbine. The invention also relates to a method for operating such a fuel supply system.

BACKGROUND OF THE INVENTION

Particularly in the case of power plant technology, specifically with gas turbines, fuel supply systems of this type are used in order to supply sufficient fuel to a burner arrangement that is operated in order, for example, to heat a combustion chamber of a gas turbine. Such a burner arrangement can have one or more burners. Particularly in the case of an annular combustion chamber, a plurality of burners can be combined to form an annular burner arrangement. The fuel supply system is connected to a fuel feed line that feeds the fuel to the fuel supply system. A control valve is arranged in this fuel feed line. The feeding of fuel into the fuel supply system can be controlled by actuating this control valve.

A gas turbine is usually operated in a relatively steady-state fashion such that important parameters such as, for example, combustion chamber pressure and fuel mass flow are constant. A variation in the operational performance of the gas turbine can take place essentially through influence exerted on the fuel mass flow that passes via the burner arrangement into the combustion chamber. In other words, the burner output forms an important parameter for exerting influence on the turbine operation. Consequently, the fuel mass flow fed to the burner arrangement via the fuel supply system can be controlled in order to set or adjust turbine operating states. Provided for this purpose is a power control unit that determines as a function of a required burner output a fuel mass flow that must be fed to the burner arrangement by the fuel supply system. A valve control unit actuates the control valve as a function of the fuel mass flow thus determined in order thereby to feed the determined fuel mass flow into the fuel supply system.

However, it has emerged, particularly in the case of rapid transients, for example combustion chamber pressure and/or fuel mass flow, that a marked deviation can occur between the fuel mass flow fed into the fuel supply system by the actuation of the control valve and the fuel mass flow fed thereupon to the burner arrangement by the fuel supply system. This difference is ascribed to the volume, which can be substantial in some circumstances, of the fuel supply system, and to the compressibility of the fuel enclosed therein. Furthermore, this difference is influenced by a flow resistance of the system that occurs, in particular, at the transition between the supply system and the combustion chamber, that is to say at the burner nozzles. This deviation gives rise to an undesired operational performance in the case of a nonstationary operation of the burner arrangement and/or the gas turbine.

SUMMARY OF THE INVENTION

The invention aims to provide a remedy here. The invention as defined in the claims addresses the problem of specifying for a fuel supply system a possibility of being able to set more effectively the fuel mass flow fed to the burner arrangement.

This problem is solved with the aid of a method having the features of claim 1. The invention is based on the general idea of firstly determining from the required burner output a first setpoint for the fuel mass flow with which the burner arrangement must be supplied, in order to be able to furnish the required burner output. With the aid of this first setpoint of the fuel mass flow and, in particular, taking account of the current operating state of the fuel supply system, a second setpoint is then determined for the fuel mass flow, which is selected such that the burner arrangement is supplied with the previously determined first setpoint of the fuel mass flow by the fuel supply system fed with said second setpoint. This means that there is determined from the required first setpoint a second setpoint that, upon being fed into the fuel supply system in the current operating state has the effect that the fuel supply system outputs the desired first setpoint to the burner arrangement. The dynamic effects of the fuel supply system, for example owing to the compressibility of the enclosed volume of fuel, can be more or less eliminated by means of the mode of procedure according to the invention. The burner performance can therefore be set directly to the desired value without a time delay and without undefined intermediate states. The advantages in connection with the operation of a gas turbine fitted with a fuel supply system, in particular in a power plant, are patently obvious.

The fuel temperature in the fuel supply system can be taken into account when determining the second setpoint of the fuel mass flow. Alternatively, or in addition, it is also possible to take account of the combustion chamber pressure prevailing in a combustion chamber connected downstream of the burner arrangement. Moreover, it is also possible to take account of the volume of the fuel supply system that is filled with the fuel, as well as of the overall exit cross section of all the burners of the burner arrangement from which the fuel exits into the combustion chamber. The current operating state of the fuel supply system can be more or less characterized with the aid of these parameters, it thereby being possible to take account more or less of the current operating state of the fuel supply system when determining the second setpoint for the fuel mass flow.

The problem on which the invention is based is also solved by a fuel supply system having the features of claim 8. Here, as well, the invention is based on the general idea of firstly determining a first setpoint for the fuel mass flow as a function of the required burner output, and then determining a second setpoint for the fuel mass flow as a function of this first setpoint, in order, finally, to actuate the control valve as a function of the determined second setpoint. The determination, in particular calculation, of the second setpoint of the fuel mass flow is performed in this case by means of a dynamic correction unit that determines the second setpoint dynamically as a function of the previously determined first setpoint such that the burner arrangement is supplied more or less exactly with the desired first setpoint by the fuel supply system fed with said second setpoint.

In one particular embodiment, the dynamic correction unit is interposed between a power control unit determining the first setpoint and a valve control unit actuating the control valve, the output signals of the power supply unit, that is to say at least the first setpoint of the fuel mass flow, being fed to the input of the dynamic correction unit, and the output signals of the dynamic correction unit, that is to say at least the second setpoint of the fuel mass flow, being fed to the input of the valve control unit. The valve control unit then actuates the control valve as a function of this second setpoint, such that the second setpoint of the fuel mass flow is consequently fed to the fuel supply system. This specific embodiment has the advantage that it can subsequently be integrated in a particularly simple fashion into an already existing system in which the dynamic correction unit is incorporated in the data and/or signal stream in the manner of a series connection between the power control unit and the valve control unit.

Further important features and advantages of the invention follow from the subclaims, from the drawing and from the associated description of the figure with the aid of the drawing.

BRIEF DESCRIPTION OF THE DRAWINGS

A preferred exemplary embodiment of the invention is illustrated in the drawing, and will be explained in more detail in the following description.

The sole

DETAILED DESCRIPTION OF THE INVENTION

Figure 1:
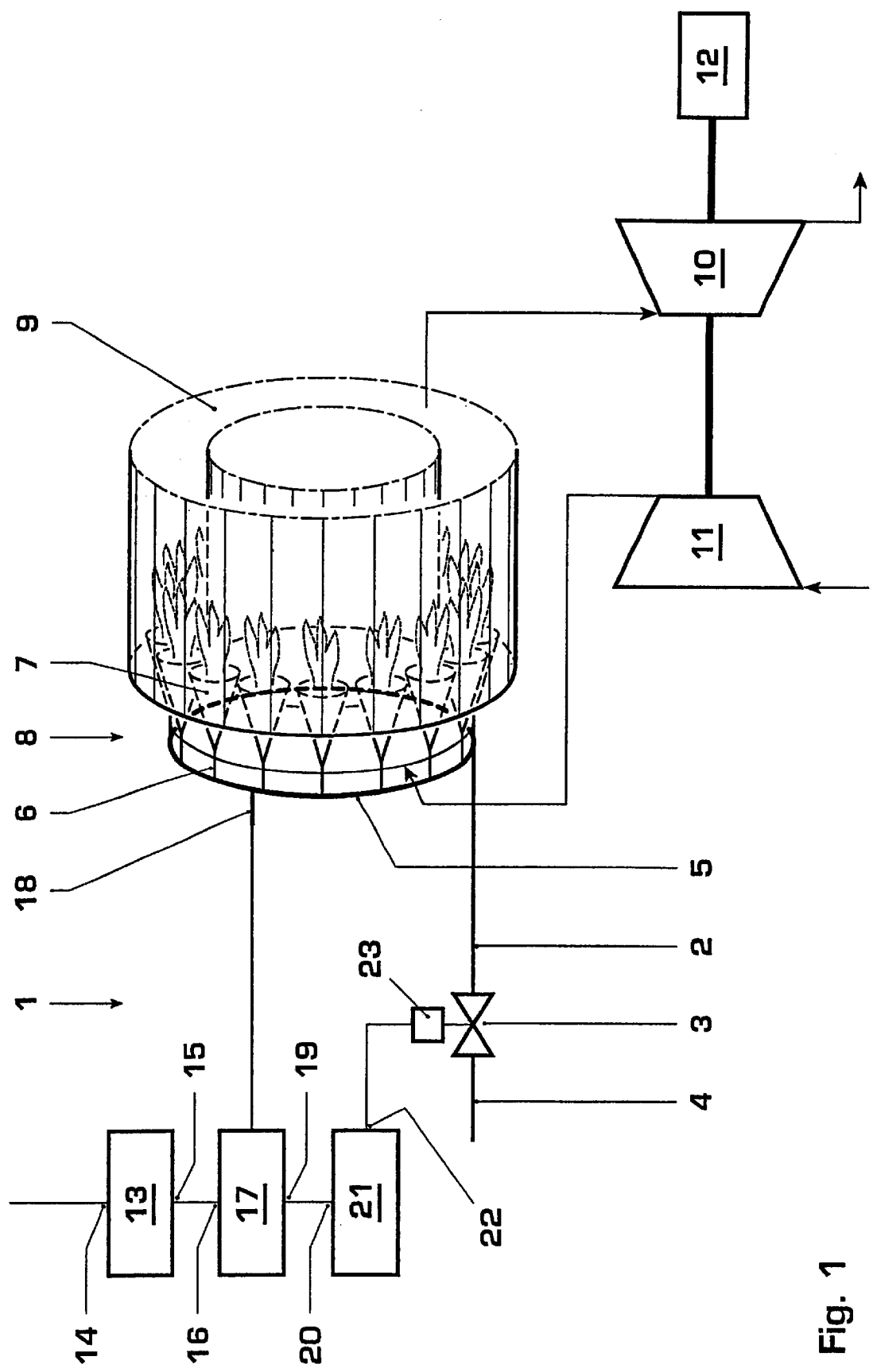
FIG. 1 shows a greatly simplified illustration of the principle of a fuel supply system according to the invention.

In accordance with FIG. 1, a fuel supply system 1 according to the invention can have, for example, a fuel line 2 that is connected at one end to a fuel feed line 4 via a control valve 3 of the fuel supply system 1, and has at its other end an annular line portion 5 that is connected via corresponding connecting lines 6 to burners 7 of a burner arrangement 8. In this burner arrangement 8 illustrated by way of example, the individual burners 7 are arranged in an annular fashion and serve the purpose, for example, of heating a downstream combustion chamber 9 that is designed here as an annular chamber. The combustion chamber 9 is preferably assigned to a gas turbine 10 in order to apply hot, compressed combustion exhaust gases to the latter. The turbine 10 drives a compressor 11 that serves to supply fresh air to the combustion chamber 9 of the turbine 10. If the turbine 10 constitutes a component of a power plant, said turbine can also drive a generator 12 for power generation.

For the sake of clarity, only some of the burners 7 of the burner arrangement 8 are illustrated. It is clear that the burner arrangement 8 can also have a different number and arrangement of burners, in particular an embodiment in which the burner arrangement 8 has only a single burner 7 is also possible.

The fuel supply system 1 also comprises a power control unit 13 that, in particular, receives via its input 14 requirements for a burner output to be provided by the burner arrangement 8. These burner output requirements can come, for example, from a high-level turbine control (not shown). The power control unit 13 is connected at its output 15 to an input 16 of a dynamic correction unit 17. This dynamic correction unit 17 is connected, for example, to a temperature sensor 18 that determines a temperature value correlating with the temperature of the fuel contained in the fuel supply system 1. At its output 19, the dynamic correction unit 17 is connected to an input 20 of a valve control unit 21 that, for its part, is connected via its output 22 to an actuator 23 that serves to actuate the control valve 3.

The fuel supply system 1 is operated as follows according to the invention: The power supply unit 13 receives a requirement for a burner output and determines as a function of this required burner output a first setpoint $\dot{m}_{out}$ for a fuel mass flow with which the burner arrangement must be supplied, in order to be able to furnish the required burner output.

In the case of a conventional fuel supply system 1 that need only set steady-state operating states of the burner arrangement 8 and/or the turbine 10, the first setpoint, determined by the power control unit 13, of the fuel mass flow $\dot{m}_{out}$ can be passed on directly to the valve control unit 21, which would then, as a function of this first setpoint of the fuel mass flow $\dot{m}_{out}$, actuate the control valve 3 via the actuator 23 such that the fuel feed line 4 injects this first setpoint of the fuel mass flow $\dot{m}_{out}$ into the fuel supply system 1 or into the fuel line 2 thereof. After a certain transition time, this first setpoint of the fuel mass flow $\dot{m}_{out}$ is also set at the burner arrangement 8. Such time delays are not desired in the case of nonstationary operation of the burner arrangement 8 or the turbine 10; the aim is for the burner output to have the respectively desired value virtually without delay. In the case of a dynamic adjustment of the burner output, however, owing to the compressibility of the fluid, that is to say liquid or gaseous fuel, in particular, and to the relatively large volume of fuel contained in the fuel supply system 1, dynamic effects occur which result in the fact that the fuel mass flow fed to the burner arrangement 8 by the fuel supply system 1 deviates from the fuel mass flow fed into the fuel supply system 1.

In the case of the fuel supply system according to the invention, in order to correct this deviation the dynamic correction unit 17 is interposed in the manner of a series connection between the power control unit 13 and the valve control unit 21. The dynamic correction unit 17 determines as function of the incoming first setpoint of the fuel mass flow $\dot{m}_{out}$ a second setpoint $\dot{m}_{in}$ for the fuel mass flow, this second setpoint of the fuel mass flow $\dot{m}_{in}$ being selected such that the fuel supply system 1 fed thereby supplies the burner arrangement 8 more or less exactly with the first setpoint, determined by the power control unit 13, of the fuel mass flow $\dot{m}_{out}$. The second setpoint, determined by the dynamic correction unit 17, of the fuel mass flow $\dot{m}_{in}$ is fed to the valve control unit 21 which, as function thereof, actuates the control valve 3 via the actuator 23. Consequently, the second setpoint of the fuel mass flow $\dot{m}_{in}$ is fed into the fuel supply system 1 or into the fuel line 2 thereof. Since this second fuel mass flow setpoint $\dot{m}_{in}$ intakes account more or less exactly of the dynamic effects of the fuel supply system 1, it follows that the fuel supply system 1 outputs more or less exactly the desired first fuel mass flow setpoint $\dot{m}_{out}$ to the burner arrangement 8. Consequently, the invention makes the desired burner output available virtually without a time delay. Furthermore, it is also possible to control nonstationary operating states of the burner arrangement 8 or the turbine 10 relatively accurately. When determining the second fuel mass flow setpoint $\dot{m}_{in}$, the dynamic correction unit 17 can take account of at least one parameter characterizing the current operating state of the fuel supply system 1. In particular, when determining the second fuel mass flow setpoint $\dot{m}_{in}$, the dynamic correction unit 17 can take account via the temperature sensor 18 of the fuel temperature T and/or of the combustion chamber pressure $p_{BC}$ prevailing in the combustion chamber 9, and/or of the volume V, filled with the fuel, of the fuel supply system 1, and/or of the overall exit cross section A of all the burners 7 of the burner arrangement 8, from which cross section the fuel exits into the combustion chamber 9, and/or of the flow resistance $z/A^2$ of the fuel supply system 1 at the transition between the burner arrangement 8 and combustion chamber 9.

In a preferred embodiment, the power control unit 13 can determine as a function of a required turbine output a second setpoint for a compressor pressure $pk2_{cmd}$ to be set at the compressor 11. The dynamic correction unit 17 can expediently calculate the combustion chamber pressure $p_{BC}$ from this compressor pressure value $pk2^{cmd}$.

In accordance with a particular feature of the present invention, the second setpoint of the fuel mass flow $\dot{m}_{in}$, can be determined by analogy with the following equation:

$$\dot{m}_{in} = \frac{k_1}{T} \frac{d\left(\frac{p_{BC} + \sqrt{p_{BC}^2 + k_2 \dot{m}_{out}^2 T}}{2}\right)}{dt} + \dot{m}_{out}.$$

In this case, $$k_1 = \frac{V}{\kappa R}$$

is a factor taking account of the volume V, filled with fuel, of the fuel supply system 1, and $$k_2 = 2\zeta \frac{R}{A^2}$$

is a factor taking account of the flow resistance of the burner arrangement 8.

In this case:

V=volume of the fuel supply system 1 filled with fuel
k=isentropic exponent of the fuel
R=specific gas constant of the fuel
z=pressure loss coefficient of the burner arrangement 8
A=overall exit cross section of all the burners 7 of the burner arrangement 8
T=temperature of the fuel in the fuel supply system 1
$p_{BC}$=combustion chamber pressure
$\dot{m}_{in}$=second setpoint of the fuel mass flow
$\dot{m}_{out}$=first setpoint of the fuel mass flow.

The abovenamed equation is based on the assumptions that the overall fuel supply system 1 has a single volume V filled with fuel, and that the fuel is an ideal gas with the material values R, $c_p$, k, in which case:

$c_p$=the thermal capacity of the fuel.

It holds in the case of the substitute model thus formed that:

$$m = \frac{pV}{RT}$$

where:

p=fuel pressure in the fuel supply system 1
m=fuel mass contained in the fuel supply system 1
V=volume of the fuel supply system 1 filled with fuel
R=specific gas constant of the fuel
T=temperature of the fuel in the fuel supply system 1.

Differentiating and transforming this equation yields:

$$\dot{m} = \frac{pV}{RT}\left(\frac{\dot{p}}{p} - \frac{\dot{T}}{T}\right) = \dot{m}_{in} \cdot \dot{m}_{out}$$

or $$\dot{m}_{in} = \frac{pV}{RT}\left(\frac{\dot{p}}{p} - \frac{\dot{T}}{T}\right) + \dot{m}_{out}$$

where:

$\dot{m}_{in}$=mass flow through the control valve 3 into the fuel supply system 1 (second setpoint of the fuel mass flow)
$\dot{m}_{out}$=mass flow through the burner arrangement 8 into the combustion chamber 9 (first setpoint of the fuel mass flow).

In the case of an idealized point of view, $\dot{m}_{out}$ is set equal to the first setpoint, determined by the power control unit 13, of the fuel mass flow.

Without dissipation and heat input it then holds that:

dh−vdp=0
dh=vdp
$c_p$dT=vdp $$\frac{dT}{dt} = \frac{v}{c_p}\frac{dp}{dt}$$

$$\dot{T} = \frac{1}{c_p \rho}\dot{p}$$

where:

r=density of the fuel in the fuel supply system 1, and
$c_p$=thermal capacity of the fuel.

Substituting this in the above equation then yields:

$$\dot{m}_{in} = \frac{pV}{RT}\left(\frac{\dot{p}}{p} - \frac{1}{c_p \rho}\frac{\dot{p}}{T}\right) + \dot{m}_{out}$$

Using $$\frac{1}{\rho T} = \frac{R}{p},$$

the result is then:

$$\dot{m}_{in} = \frac{\dot{p}V}{RT}\left(1 - \frac{R}{c_p}\right) + \dot{m}_{out}$$

and using $$\left(1 - \frac{R}{c_p}\right) = \frac{1}{\kappa}$$

the following transformation is obtained:

$$\dot{m}_{in} = \frac{\dot{p}V}{\kappa RT} + \dot{m}_{out}$$

where
k=isentropic exponent of the fuel.

The first term on the right-hand side thus forms the correction term for the transients (combustion chamber pressure and/or fuel mass flow), it holding in the steady-state case that:

$\dot{m}_{in} = \dot{m}_{out}$.

The pressure change $\dot{p}$ is still lacking for the purpose of calculating this correction term. It is possible by neglecting the temperature change $\dot{T}$ in the above transformation to come to virtually the same result, but without k in the denominator. The required pressure change $\dot{p}$ in the fuel supply system 1 can be determined via the pressure drop across the burner arrangement 8:

$$\Delta p = \zeta \frac{\rho}{2} v^2 = \zeta \frac{\rho}{2} \left(\frac{\dot{m}_{out}}{\rho A}\right)^2 = \zeta \frac{\dot{m}_{out}^2}{2\rho A^2} = \zeta \frac{\dot{m}_{out}^2 RT}{2pA^2} = p - p_{BC}$$

where
z=pressure loss coefficient of the burner arrangement 8
A=overall exit cross section of all the burners 7 of the burner arrangement 8.

The above quadratic equation can be solved for p:

$$p = p_{BC} + \Delta p = p_{BC} + \zeta \frac{\dot{m}_{out}^2 RT}{2pA^2}$$

$$p^2 = p_{BC} p + \zeta \frac{\dot{m}_{out}^2 RT}{2pA^2}$$

$$p^2 - p_{BC} p - \zeta \frac{\dot{m}_{out}^2 RT}{2pA^2} = 0$$

$$p = \frac{p_{BC} + \sqrt{p_{BC}^2 + 2\zeta \frac{\dot{m}_{out}^2 RT}{A^2}}}{2}.$$

The second solution to the quadratic equation yields negative values for p.

The expression thus obtained is differentiated and substituted in the above equation for $\dot{m}_{in}$:

$$\dot{m}_{in} = \frac{V}{\kappa RT} \frac{d\left(\frac{p_{BC} + \sqrt{p_{BC}^2 + 2\zeta \frac{\dot{m}_{out}^2 RT}{A^2}}}{2}\right)}{dt} + \dot{m}_{out}.$$

Various parameters can be combined using $$k_1 = \frac{V}{\kappa R}$$

and $$k_2 = 2\zeta \frac{R}{A^2},$$

such that finally the equation mentioned at the beginning once again results:

$$\dot{m}_{in} = \frac{k_1}{T} \frac{d\left(\frac{p_{BC} + \sqrt{p_{BC}^2 + k_2 \dot{m}_{out}^2 T}}{2}\right)}{dt} + \dot{m}_{out}.$$

The numerical derivation of the fuel pressure p in the fuel supply system 1 can be carried out, for example, with the aid of a differentiation module.

List of reference numerals

| | |
|---|---|
| 1 | Fuel supply system |
| 2 | Fuel line |
| 3 | Control valve |
| 4 | Fuel feed line |
| 5 | Line portion |
| 6 | Connecting line |
| 7 | Burner |
| 8 | Burner arrangement |
| 9 | Combustion chamber |
| 10 | Gas turbine |
| 11 | Compressor |
| 12 | Generator |
| 13 | Power control unit |
| 14 | Input of 13 |
| 15 | Output of 13 |
| 16 | Input of 17 |
| 17 | Dynamic correction unit |
| 18 | Temperature sensor |
| 19 | Output of 17 |
| 20 | Input of 21 |
| 21 | Valve control unit |
| 22 | Output of 21 |
| 23 | Actuator |

What is claimed is:

1. A method for open-loop control operation of a fuel supply system that supplies a fluid fuel to a burner arrangement with one or more burners for a gas turbine,
   in which the fuel supply system has on the inlet side a control valve that feeds the fuel into the fuel supply system as a function of its actuation,
   in which, firstly, as a function of a requested burner output, a first setpoint is determined for a fuel mass flow with which the burner arrangement must be supplied in order to be able to furnish the required burner output,
   in which as a function of this first setpoint of the fuel mass flow a second setpoint is determined for the fuel mass flow, which is then fed into the fuel supply system by an appropriate actuation of the control valve, and
   in which the second setpoint of the fuel mass flow is selected such that the fuel supply system fed therewith supplies the burner arrangement essentially with the first setpoint of the fuel mass flow.

2. The method as claimed in claim 1, wherein when determining the second setpoint of the fuel mass flow at least one parameter characterizing the current operating state of the fuel supply system is taken into account.

3. The method as claimed in claim 1, wherein when determining the second setpoint of the fuel mass flow the fuel temperature in the fuel supply system is taken into account.

4. The method as claimed in claim 1, wherein when determining the second setpoint of the fuel mass flow the combustion chamber pressure prevailing in a combustion chamber downstream of the burner arrangement is taken into account.

5. The method as claimed in claim 4, wherein the burner arrangement heats the combustion chamber of a gas turbine that drives a compressor for supplying fresh air to the turbine, the combustion chamber pressure being calculated from a setpoint, to be set at the compressor, for the compressor pressure that is determined, for its part, as a function of a requested turbine output.

6. The method as claimed in claim 1, wherein when determining the second setpoint of the fuel mass flow the volume, filled with fuel, of the fuel supply system is taken into account.

7. The method as claimed in claim 1, wherein when determining the second setpoint of the fuel mass flow an overall exit cross section of all the burners of the burner arrangement from which the fuel exits from the burner arrangement, and/or a flow resistance of the burner arrangement is taken into account.

8. The method as claimed in claim 1, wherein the second setpoint of the fuel mass flow is determined by analogy with the following equation:

$$\dot{m}_{in} = \frac{k_1}{T} \frac{d\left(\frac{p_{BC} + \sqrt{p_{BC}^2 + k_2 \dot{m}_{out}^2 T}}{2}\right)}{dt} + \dot{m}_{out}$$

where $$k_1 = \frac{V}{\kappa R}$$

$$k_2 = 2\zeta \frac{R}{A^2}$$

in which

V=volume of the fuel supply system filled with fuel k=isentropic exponent of the fuel R=specific gas constant of the fuel z=pressure loss coefficient of the burner arrangement A=overall exit cross section of all the burners of the burner arrangement T=temperature of the fuel in the fuel supply system $p_{BC}$=combustion chamber pressure $\dot{m}_{in}$=second setpoint of the fuel mass flow $\dot{m}_{out}$=first setpoint of the fuel mass flow.

* * * * *